(12) United States Patent
Yeh et al.

(10) Patent No.: US 8,462,195 B2
(45) Date of Patent: Jun. 11, 2013

(54) PANORAMIC IMAGING LENS AND PANORAMIC IMAGING SYSTEM USING THE SAME

(75) Inventors: Hsin-Tsung Yeh, Taipei Hsien (TW); Mei-Chun Lin, Taipei Hsien (TW); Kuan-Ting Chen, Taipei Hsien (TW); Kuang-Wei Lin, Taipei Hsien (TW); Wei-Hsiu Chang, Taipei Hsien (TW); Chun-Hsiang Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 462 days.

(21) Appl. No.: 12/732,150

(22) Filed: Mar. 25, 2010

(65) Prior Publication Data

US 2011/0074917 A1    Mar. 31, 2011

(30) Foreign Application Priority Data

Sep. 30, 2009   (CN) .......................... 2009 1 0308006

(51) Int. Cl.
*H04N 7/00*   (2011.01)
*G02B 17/08*  (2006.01)

(52) U.S. Cl.
USPC ............................................ 348/36; 359/730

(58) Field of Classification Search
USPC ............................. 348/36; 359/730; 600/160
IPC ......................................................... H04N 7/00
See application file for complete search history.

(56) References Cited

U.S. PATENT DOCUMENTS

| | | | | |
|---|---|---|---|---|
| 4,566,763 | A  * | 1/1986  | Greguss ........................ | 359/725 |
| 5,473,474 | A  * | 12/1995 | Powell .......................... | 359/725 |
| 2003/0099045 | A1* | 5/2003 | Doi ............................... | 359/725 |
| 2006/0152819 | A1 | 7/2006 | Gal et al. | |
| 2006/0171025 | A1* | 8/2006 | Quake et al. .................. | 359/368 |
| 2009/0082629 | A1* | 3/2009 | Dotan et al. .................. | 600/160 |
| 2010/0097679 | A1* | 4/2010 | Hirakawa .................. | 359/201.2 |

FOREIGN PATENT DOCUMENTS

TW    578008 B    3/2004

* cited by examiner

*Primary Examiner* — Gims S Philippe
*Assistant Examiner* — Richard Carter
(74) *Attorney, Agent, or Firm* — Altis Law Group, Inc.

(57) ABSTRACT

A panoramic imaging system includes a panoramic imaging lens, a relay lens, an imaging device, and a display device. The panoramic imaging lens includes an annular incident surface and a bottom surface adjacent to the annular incident surface. The bottom surface includes an annular reflective portion substantially opposite to the annular incident surface. An image light incident through the annular incident surface can be total reflected by the annular reflective portion.

11 Claims, 2 Drawing Sheets

PANORAMIC IMAGING LENS AND PANORAMIC IMAGING SYSTEM USING THE SAME

BACKGROUND

1. Technical Field

The present disclosure relates to imaging systems and, particularly, to a panoramic imaging lens capable of imaging a lateral perspective of 360° circumference as an annular image, and a panoramic imaging system utilizing the panoramic imaging lens.

2. Description of Related Art

Generally, a panoramic imaging lens of a panoramic imaging system is symmetrically formed around a light axis and includes an annular incident surface, and an annular reflective surface formed adjacent to and substantially opposite to the light incident surface. A reflective film needs to coat on the annular reflective surface to reflect a lateral light that is incident from the annular incident surface. However, a process to coat the reflective film on the annular reflective surface is difficult and time-consuming; in addition, the cost for manufacturing the panoramic imaging lens will increase.

Therefore, it is desirable to provide a panoramic imaging lens and a panoramic imaging system, which can overcome the above-mentioned problems.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
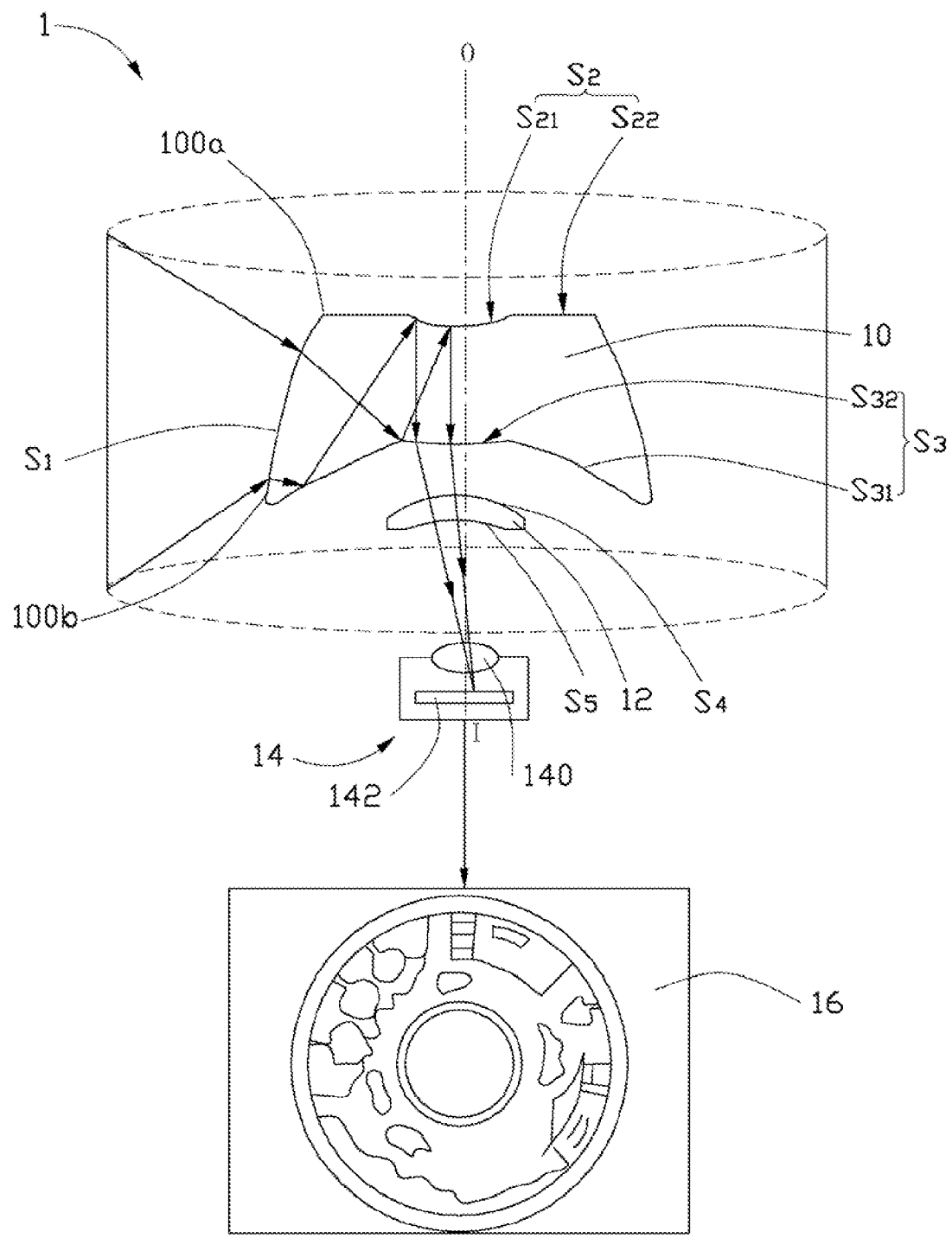
FIG. 1 is a schematic view of an exemplary embodiment of a panoramic imaging system.

Referring to FIG. 1, a panoramic imaging system 1, according to an exemplary embodiment, is shown. The panoramic imaging system 1 includes, from the object side to the image side, a panoramic imaging lens 10, a relay lens 12, an imaging device 14, and a display device 16.

The panoramic imaging lens 10 is made of a light permeable material, such as optical glass, transparent resin, etc. The panoramic imaging lens 10 rotational symmetrically forms around a light axis OI of the panoramic imaging lens 10 and includes an annular incident surface $S_1$, an upper surface $S_2$, and a bottom surface $S_3$.

The annular incident surface $S_1$ rotates symmetrically about the light axis OI and includes a circular inner edge 100a corresponding to the object side and a circular outer edge 100b corresponding to the image side. The annular incident surface $S_1$ tilts to the light axis OI at a predetermined angle. The distance between the points on the inner edge 100a and the light axis OI is smaller than the distance between the points on the outer edge 100b and the light axis OI. With reference to a direction from the object side to the image side, the radius of the curvature of the annular incident surface $S_1$ is positive. The annular incident surface $S_1$ is a convex surface. Thus, a lateral image light from 360° can enter into the panoramic imaging lens 10 from the annular incident surface $S_1$.

The bottom surface $S_3$ is circular and rotates symmetrically about the light axis OI. The light axis OI passes through a center of the bottom surface $S_3$. The bottom surface $S_3$ includes an annular reflective portion $S_{31}$ and a light outgoing portion $S_{32}$. The light outgoing portion $S_{32}$ is a circular convex surface formed at a central part of the bottom surface $S_3$. The annular reflective portion $S_{31}$ is a concave surface and connects between a periphery of the light outgoing portion $S_{32}$ and the outer edge 100b of the annular incident surface $S_1$.

With reference to the direction from the object side to the image side, the radius of the curvature of the light outgoing portion $S_{32}$ is negative, the radius of the curvature of the annular reflective portion $S_{31}$ is positive. The annular reflective portion $S_{31}$ tilts to the light axis OI at an angle larger than the annular incident surface $S_1$ to reflect the image light incident through the annular incident surface $S_1$ to the upper surface $S_2$. The light outgoing portion $S_{32}$ focuses the image light reflected from the upper surface $S_2$.

The upper surface $S_2$ is circular and rotates symmetrically about the light axis OI. The light axis OI passes through the center of the upper surface $S_2$. The upper surface $S_2$ includes a circular reflective portion $S_{21}$ and a connecting portion $S_{22}$. The circular reflective portion $S_{21}$ is a concave surface formed at a central part of the upper surface $S_2$. The connecting portion $S_{22}$ is an annular flat surface and connects between a periphery of the circular reflective portions $S_{21}$ and the first inner edge 100a of the annular light incident surface $S_1$.

With reference to the direction from the object side to the image side, the radius of the curvature of the circular reflective portion $S_{21}$ is negative. A reflective film coats on the circular reflective portion $S_{21}$ to reflect the image light from the annular reflective portion $S_{31}$ to the light outgoing portion $S_{32}$.

The relay lens 12 has positive refractive power for condensing the image light outputting from the light outgoing portion $S_{32}$. The relay lens 12 includes a light incident surface $S_4$ and a light outgoing surface $S_5$. With reference to the direction from the object side to the image side, the radius of the curvature of the light incident surface $S_4$ and the light outgoing surface $S_5$ is positive.

The imaging device 14 includes a lens group 140, an imaging sensor 142, and a number of necessary controlling sections not shown in the figures. The lens group 140 is configured for acquiring an image. The imaging sensor 142, such as a charge coupled device (CCD), complementary metal oxide semiconductor (CMOS) etc., is provided at the focus location of the lens group 140.

A panoramic landscape of 360° circumference acquired by the panoramic imaging lens 10, once converted to an electric signal by the imaging sensor 142 of the imaging device 14 displays on the display device 16. The display device 16 can be a liquid crystal display (LCD), a cathode-ray tube (CRT) etc.

Figure 2:
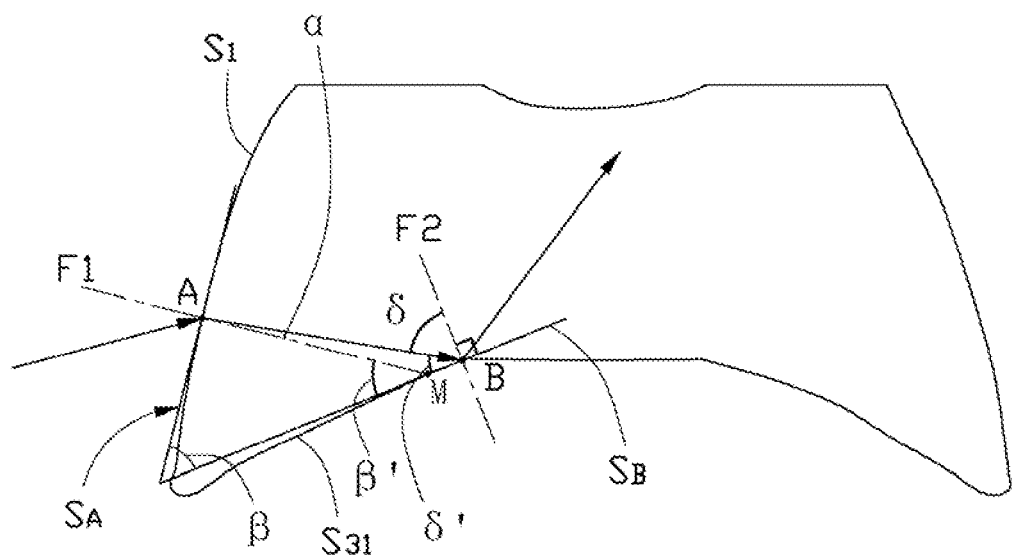
FIG. 2 is a schematic view of a total reflection optical route in a panoramic imaging lens of the panoramic imaging system in FIG. 1.

Referring to FIG. 2, shown is a schematic view of a total reflection optical route of the image light between the annular incident surface $S_1$ and the annular reflective portion $S_{31}$. The image light refracts into the interior of the panoramic imaging lens 10 at a refraction point A on the annular incident surface $S_1$ and then totally reflects at a reflection point B on the annular reflective portion $S_{31}$. As shown in FIG. 2, $S_A$ denotes a first tangent plane including the refraction point A. $S_B$ denotes a second tangent plane including the reflection point B. $F_1$ denotes a first normal line of the refraction point A. $F_2$ denotes a second normal line of the reflection point B. $\alpha$ denotes a refraction angle of the image light at the refraction point A. $\delta$ denotes a incident angle of the image light at the reflection point B. $\delta'$ denotes a complement angle of $\delta$. $\beta$ denotes an angle between the first tangent plane $S_A$ and the second tangent plane $S_B$. $\beta'$ denotes a complement angle of $\beta$. M denotes a point where the first normal line $F_1$ meets the second tangent plane $S_B$.

The geometrical relation among $\alpha$, $\delta$, $\delta'$, $\beta'$, and $\beta$ in the FIG. 2 can be expressed as below:

$$\begin{cases} \beta' + \beta = 90° \\ \alpha + \delta' = \beta' \\ \delta' + \delta = 90° \end{cases}$$

The simplified relation can be expressed as: $\alpha+\beta=\delta$. According to the refraction law, if the image light is required to be totally reflected on the annular reflective portion $S_{31}$, the incident angle $\delta$ must larger than the critical angle $\theta$ of the total reflection between the panoramic imaging lens 10 and the air, that is $\alpha+\beta>\theta$. Thus, for the same image light, the refraction point A on the annular incident surface $S_1$ and the reflection point B on the annular reflective portion $S_{31}$ satisfies the relation: $\alpha+\beta>\theta$. Wherein $\alpha$ is a refraction angle of the image light at the refraction point A, $\beta$ is an angle between the first tangent plane $S_A$ including the refraction point A and the second tangent plane $S_B$ including the reflection point B.

Detailed examples of the panoramic imaging lens 10 are given below with an accompany table 1 and table 2, but it should be noted that the panoramic imaging lens 10 is not limited by these examples. Listed below are the symbols used in these detailed examples:

R: radius of curvature;

Nd: refractive index of lens; and

D: distance between surfaces on the optical axis of the panoramic imaging lens.

TABLE 1

| Surface | R (mm) | D (mm) | Nd |
|---|---|---|---|
| $S_1$ | 14.43 | 19.965 | 1.54347 |
| $S_{31}$ | 14.80 | −10.8 | 1.54347 |
| $S_{21}$ | −11.19 | 12.25 | 1.54347 |
| $S_{32}$ | −33.81 | 5.29 | 1.54347 |
| $S_4$ | 8.64 | 3.104 | 1.531131 |
| $S_5$ | 10.00 |  | 1.531131 |

In this embodiment, each surface of the panoramic imaging lens 10 and the relay lens 16 is an aspherical surface. The aspherical surface is shaped according to the formula:

$$x = \frac{ch^2}{1+\sqrt{1-(k+1)c^2h^2}} + \sum A_i h^i$$

where h is a height from the optical axis of the panoramic imaging lens 10 to the aspherical surface, c is a vertex curvature, k is a conic constant, and Ai are i-th order correction coefficients of the aspherical surfaces. The aspherical coefficient of the panoramic imaging lens 10 and the relay lens 16 are shown in table 2:

TABLE 2

| Surface | K | $A_1$ | $A_6$ |
|---|---|---|---|
| $S_1$ | −0.498 | −0.00001879 | 0.0000001652 |
| $S_{31}$ | −2.461 | −0.00002117 | 0.0000000417 |
| $S_{21}$ | −2.809 | 0.00004755 | 0.0000013324 |
| $S_{32}$ | −15.048 | 0.00004889 | 0.0000000000 |
| $S_4$ | −2.355 | 0.0001094 | 0.0000000000 |
| $S_5$ | −2138.170 | 0.00003259 | 0.0000000000 |

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A panoramic imaging lens comprising:
    an annular incident surface symmetrically formed around a light axis of the panoramic imaging lens;
    a circular bottom surface symmetrically formed about the light axis and comprising:
    a light outgoing portion formed in convex form at a central part of the circular bottom surface; and
    an annular reflective portion formed in a concave form and connecting between a periphery of the light outgoing portion and the annular incident surface to total reflect the light from the annular incident surface; and
    a circular upper surface symmetrically formed about the light axis and comprising:
    a circular reflective portion formed in a concave form at a central part of the circular upper surface to reflect the light from the annular reflective portion toward the light outgoing portion; and
    an annular connecting portion formed in a flat form connecting between a periphery of the circular reflective portion and the annular light incident surface, an incident point on the annular incident surface and a reflection point on the annular reflective portion of the same light satisfies the relation: $\alpha+\beta>\theta$, wherein $\alpha$ is a refraction angle of the light at the refraction point, $\beta$ is an angle between a first tangent plane comprising the refraction point and a second tangent plane comprising the reflection point, $\theta$ is the critical angle of the total reflection between the panoramic imaging lens and the air, and wherein a surface of the annular reflective portion is an aspherical surface, and the aspherical surface is shaped according to a formula:

$$x = \frac{ch^2}{1+\sqrt{1-(k+1)c^2h^2}} + \sum A_i h^i,$$

where h is a height from the optical axis of the panoramic imaging lens to the aspherical surface, c is a vertex curvature, k is a conic constant, and Ai are i-th order correction coefficients of the aspherical surface.

2. The panoramic imaging lens as claimed in claim 1, wherein the annular incident surface is formed in a convex form and comprises a circular inner edge corresponding to the object side and a circular outer edge corresponding to the image side, the annular reflective portion connects between the periphery of the light outgoing portion and the outer edge, the radius of the curvature of the annular incident surface and the annular reflective surface is positive referring to a direction from a object side to an image side.

3. The panoramic imaging lens as claimed in claim 2, wherein the annular connecting portion connects between the periphery of the circular reflective portion and the inner edge, the radius of the curvature of the circular reflective portion is negative referring to a direction from the object side to the image side, a reflective film is coated on the circular reflective portion for reflecting the light from the annular reflective portion to the light outgoing portion.

4. The panoramic imaging lens as claimed in claim 1, wherein the radius of the curvature of the light outgoing surface is negative referring to a direction from the object side to the image side.

5. A panoramic imaging system comprising:
a panoramic imaging lens;
a relay lens for condensing a light output from the panoramic imaging lens;
a imaging device for acquiring an image according to the condensed light and converting the image to an electric signal; and
a display device electrical connected to the imaging device for displaying the image acquired by the imaging device, the panoramic imaging lens comprising:
an annular incident surface symmetrically formed around a light axis of the panoramic imaging lens;
a circular bottom surface symmetrically formed about the light axis and comprising:
a light outgoing portion formed in convex form at a central part of the circular bottom surface; and
an annular reflective portion formed in a concave form and connecting between a periphery of the light outgoing portion and the annular incident surface to total reflect the light from the annular incident surface; and
a circular upper surface symmetrically formed about the light axis and comprising:
a circular reflective portion formed in a concave form at a central part of the circular upper surface to reflect the light from the annular reflective portion toward the light outgoing portion; and
an annular connecting portion formed in a flat form connecting between a periphery of the circular reflective portion and the annular light incident surface, an incident point on the annular incident surface and a reflection point on the annular reflective portion of the same light satisfies the relation: $\alpha+\beta>\theta$, wherein $\alpha$ is a refraction angle of the light at the refraction point, $\beta$ is an angle between a first tangent plane comprising the refraction point and a second tangent plane comprising the reflection point, $\theta$ is the critical angle of the total reflection between the panoramic imaging lens and the air, and wherein a surface of the annular reflective portion is an aspherical surface, and the aspherical surface is shaped according to a formula:

$$x = \frac{ch^2}{1 + \sqrt{1-(k+1)c^2h^2}} + \sum A_i h^i,$$

where h is a height from the optical axis of the panoramic imaging lens to the aspherical surface, c is a vertex curvature, k is a conic constant and Ai are i-th order correction coefficients of the aspherical surface.

6. The panoramic imaging system as claimed in claim 5, wherein the annular incident surface is formed in a convex form and comprises a circular inner edge corresponding to the object side and a circular outer edge corresponding to the image side, the annular reflective portion connects between the periphery of the light outgoing portion and the outer edge, the radius of the curvature of the annular incident surface and the annular reflective surface is positive referring to a direction from a object side to an image side.

7. The panoramic imaging system as claimed in claim 6, wherein the annular connecting portion connects between the periphery of the circular reflective portion and the inner edge, the radius of the curvature of the circular reflective portion is negative referring to a direction from the object side to the image side, a reflective film is coated on the circular reflective portion for reflecting the light from the annular reflective portion to the light outgoing portion.

8. The panoramic imaging system as claimed in claim 5, wherein the radius of the curvature of the light outgoing surface is negative referring to a direction from the object side to the image side.

9. The panoramic imaging system as claimed in claim 5, wherein the relay lens is a lens with positive refractive power and comprises a light incident surface and a light outgoing surface, the radius of the curvature of the light incident surface and the light outgoing surface is positive referring to a direction from the object side to the image side.

10. The panoramic imaging system as claimed in claim 5, wherein the imaging device comprises a lens group and an imaging sensor provided at the focus location of the lens group.

11. The panoramic imaging system as claimed in claim 9, wherein each surface of the relay lens is an aspherical surface, and the aspherical surface is shaped according to the formula:

$$x = \frac{ch^2}{1 + \sqrt{1-(k+1)c^2h^2}} + \sum A_i h^i,$$

where h is a height from the optical axis of the panoramic imaging lens to the aspherical surface, c is a vertex curvature, k is a conic constant, and Ai are i-th order correction coefficients of the aspherical surface.

* * * * *